(No Model.)
G. W. UPTON.
FILTER.
No. 558,328. Patented Apr. 14, 1896.
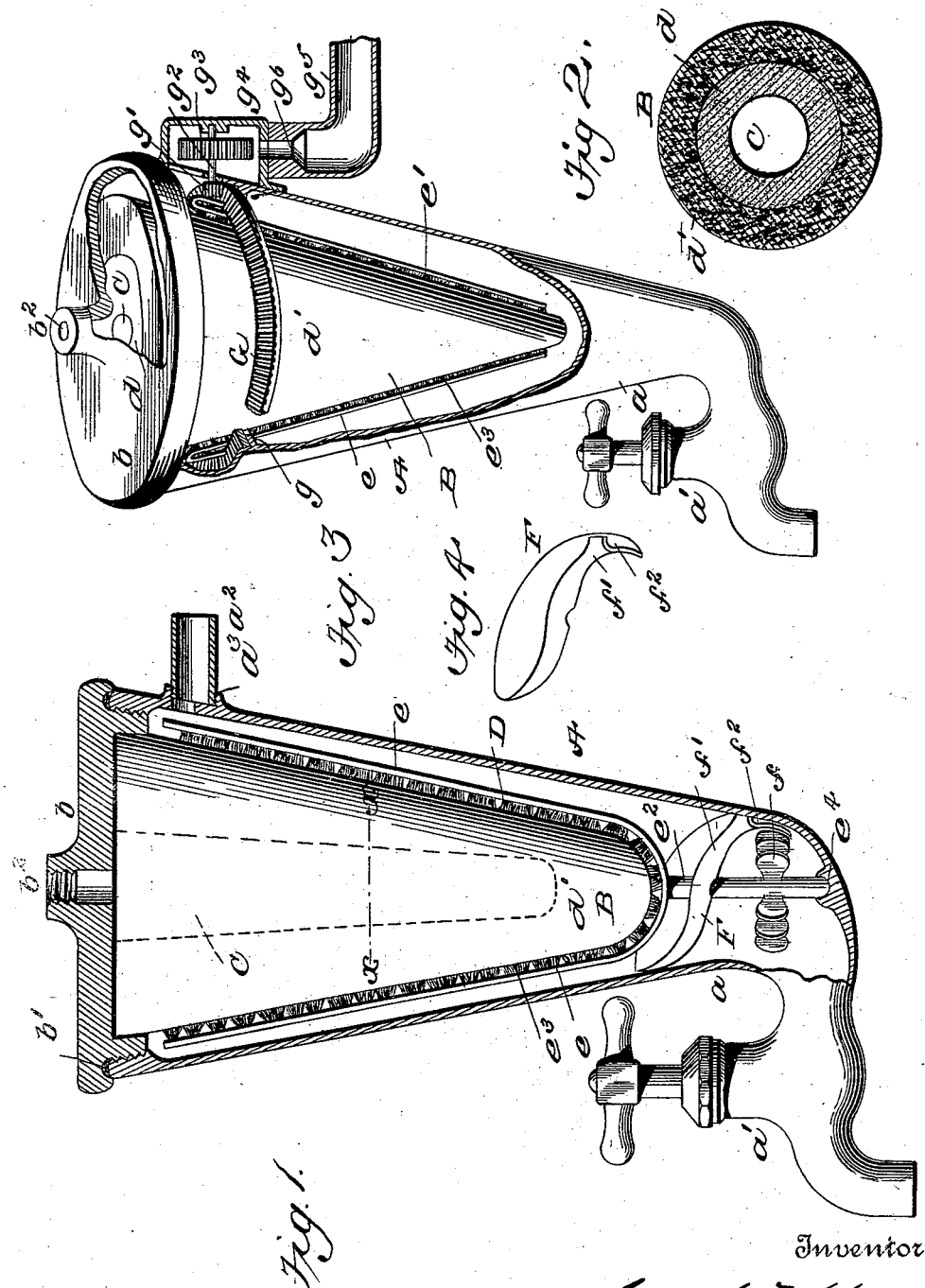
Witnesses
Inventor
George W. Upton

UNITED STATES PATENT OFFICE.

GEORGE W. UPTON, OF WARREN, OHIO.

FILTER.

SPECIFICATION forming part of Letters Patent No. 558,328, dated April 14, 1896.

Application filed February 4, 1895. Renewed March 17, 1696. Serial No. 583,635. (No model.)

*To all whom it may concern:*

Be it known that I, GEORGE W. UPTON, of Warren, in the county of Trumbull and State of Ohio, have invented certain new and useful Improvements in Filters; and I do hereby declare the following to be a full, clear, and exact description of the invention, such as will enable others skilled in the art to which it appertains to make and use the same.

This invention relates to filters, and is specially designed as an improvement upon the form shown in my pending application for patent, filed January 24, 1895, Serial No. 536,084, and that shown and described in Letters Patent No. 431,448, dated July 1, 1890.

The objects of the present invention are, first, to so form the filtering body or medium that it will be strong and durable and not likely to break under pressure, and, second, to provide for the effective rotation of the brush or cleaner, whereby all foreign substances are removed from contact with such body or medium. These objects I accomplish by providing a filtering-body of inverted-cone shape composed of two or more parts or members of different materials. This cone-body is located within a correspondingly-shaped casing, to the top of which it is rigidly secured. The outlet for the unfiltered water is at the lower end of the casing, the inlet being at the upper end thereof. The water percolates from the outside of the cone-body to an inner chamber therein. The exterior of the cone is kept free of sediment or other foreign substances by a brush or cleaner in contact therewith from end to end thereof, said brush or cleaner having spring-arms and being operated by the unfiltered water when the outlet for the latter is opened.

The invention comprises the novel features of construction and also the detail combination and arrangement of parts, substantially as hereinafter fully set forth, and particularly pointed out in the claims.

In the accompanying drawings, Figure 1 is a vertical longitudinal sectional view of a filter constructed in accordance with my invention. Fig. 2 is a horizontal sectional view on line $x\ x$ of the cone-body. Fig. 3 is a view of a slightly-modified form of my invention, parts being broken away. Fig. 4 is a detail.

Referring to the drawings, A designates the inclosing casing of approximately cone shape, having at its lower end an elongated portion $a$ in which works a faucet $a'$ for controlling the outlet of the unfiltered water. Near the top of this casing at one side opens a pipe $a^2$ for supplying the water to be filtered. The end of this pipe is partially closed by a partition $a^3$.

B is the filtering body or medium. It is of approximately cone shape and its upper widened end is cemented or otherwise secured to a cap-plate $b$, which is threaded and engages a corresponding threaded portion of casing A, a gasket $b'$ being interposed between said cap-plate and the casing. A central opening $b^2$ is for the outlet for the filtered water, said opening being over the central water-chamber C in said body. The filtering-body may be made up in two concentric parts or sections $d$ and $d'$, or it may be in one mass. The inner part $d$ is composed of any suitable porous substance, while the outer or inclosing part $d'$ is made of emery or vitrified corundum. By thus making a composite filtering-body the strength thereof is greatly increased and the filtering properties enhanced, and by having the exterior of a hard material it is not worn away by the brush or cleaner. The water percolating through the filtering-body is freed of all impurities and the latter are, by reason of the fineness of the porosity of the outer part, to a great extent, prevented from passing beyond the exterior surface thereof.

D is the cleaning device. It is shown in Fig. 1 as being composed of two spring-arms $e$ and $e'$, which extend from a perpendicular shaft $e^2$, said arms carrying bristles $e^3$, or the like, which are held tight against the outer surface of the filtering-cone by reason of the resiliency of the arms. The shaft $e^2$ rests at its lower end in a recess $e^4$, formed on the inner surface of the bottom of casing A. Upon this shaft is a series of blades $f$. Immediately above the latter is a deflector F, which is of concavo-convex form and is extended diagonally across the lower portion of the casing, the shaft $e^2$ passing through a hole in said deflector. The lower reduced end $f'$ of this deflector is extended downwardly along the inner surface of the casing on a line with the ends of the blades and one side of said end is cut away to form an opening $f^2$, corresponding in length to the width of the blades. This deflector serves to cause the unfiltered water to pass out through the opening $f^2$ and strike full against the blades. Hence when the outlet for the unfiltered water is opened the shaft $e^2$ is caused to revolve, and the brushes or scrapers carried by the tapering arms will effectively remove all sediment and the like from the exterior of the filtering-cone.

In Fig. 3 I have shown a slightly-modified form of mechanism for operating the cleaning device. The brush-carrying spring-arms are connected at their upper ends to a toothed wheel or disk G, which rests upon a circular flange $g$, projecting inwardly from the inclosing casing. With the wheel G engages a small pinion $g'$ on the inner end of a shaft $g^2$, carrying a wheel $g^3$, against which the water is designed to strike as it passes into the casing. The shaft $g^2$ is mounted at its outer end in a box-like inclosure $g^4$, into which opens the feed-pipe $g^5$, the bore of the inner end $g^6$ of said latter pipe being slightly reduced, so as to direct the inflowing water against said wheel. The turning of the latter and its shaft will cause the wheel or disk G to travel horizontally and effect the cleaning of the exterior of the filtering-cone by contact therewith of the brushes and by its slower motion prevents too rapid wear of the filtering-cone when no exterior hardening-surface is provided.

It will be observed that the spring-arms of the cleaning devices, above described, are in contact with the filtering-cone the full length of the latter and take up any wear that may occur to the cone. While I preferably employ but two such brush-carrying arms and place them opposite each other, yet it is obvious that a greater number may be used, if desired, or that there may be any form of scraper or cleaning device.

I claim as my invention—

1. In a filter having a conical inclosing casing provided with inlets and outlets for the unfiltered water, a conical filtering body or medium depending in said casing, a cleaning device having blades and a spring arm or arms constantly in contact with the exterior of said filtering-body and designed to be operated by the passage of the unfiltered water through the casing, and a deflector for directing the water against said blades of said cleaning device substantially as set forth.

2. In a filter having an inclosing casing provided with inlets and outlets for the unfiltered water, a filtering body or medium of corresponding shape depending in said casing, and a cleaning device comprising a rotary shaft designed to be operated by the unfiltered water, an arm or arms extending over said filtering-body from end to end thereof and carrying each a brush or other cleaning device, blades carried by said shaft and a deflector for directing the water against said blades substantially as set forth.

3. In a filter having a conical inclosing casing provided with inlets and outlets for unfiltered water, a conical filtering body or medium depending in said casing, a rotary shaft having blades thereon, brush-carrying spring-arms carried by said shaft extended along the exterior of said filtering-cone and a deflector for directing the unfiltered water against said blades, substantially as set forth.

4. In a filter having an inclosing casing provided with inlets and outlets for unfiltered water, a filtering body or medium depending in said casing, a rotary shaft having blades thereon, a deflector extending across said casing for directing the water against said blades, and brush-carrying spring-arms carried by said shaft, said arms extending along said filtering-body from end to end thereof, substantially as set forth.

In testimony whereof I have signed this specification in the presence of two subscribing witnesses.

GEORGE W. UPTON.

Witnesses:
W. H. SMILEY,
E. B. TAYLOR.